United States Patent [19]
Brinkman

[11] 3,993,291
[45] Nov. 23, 1976

[54] APPARATUS FOR PLASTICIZING MATERIAL SUCH AS RUBBER, SYNTHETIC PLASTICS AND LIKE PLASTICIZABLE COMPOSITIONS

[75] Inventor: Heinz Brinkman, Bennigsen, Germany

[73] Assignee: Hermann Berstorff Maschinenbau GmbH, An Der Breiten Wiese, Germany

[22] Filed: Nov. 11, 1974

[21] Appl. No.: 522,641

[30] Foreign Application Priority Data
Nov. 10, 1973 Germany............................ 2356201

[52] U.S. Cl. ............................... 259/185; 259/195; 425/201
[51] Int. Cl.² ........................................... B29B 1/10
[58] Field of Search ............... 259/6, 104, 187, 188, 259/192, 195, 189, DIG. 8, DIG. 13; 241/227, 235; 425/201, 259

[56] References Cited
UNITED STATES PATENTS

| | | |
|---|---|---|
| 2,537,395 | 1/1951 | Brown............................ 259/189 X |
| 2,674,104 | 4/1954 | Street............................. 259/6 UX |
| 3,197,147 | 7/1965 | Krohne ............................ 241/227 |
| 3,802,670 | 4/1974 | Okada.............................. 259/6 X |
| 3,856,278 | 12/1974 | Eisenmann......................... 259/192 |

Primary Examiner—Edward L. Roberts
Assistant Examiner—Alan Cantor
Attorney, Agent, or Firm—Donald D. Jeffery

[57] ABSTRACT

An apparatus for plasticizing material such as rubber, synthetics plastics and like plasticizable compositions comprising feeding material between two spaced apart surfaces, preferably rollers, at least one of which is rotatingly propelled, the surfaces being so shaped and relatively disposed that the material is repeatedly subjected to varying pressure, varying down to zero at times, and thus more intensive, less intensive and virtually no shearing work. Where the surfaces are on rollers the rollers are preferably formed with helical grooves, the rollers being rotated in the same or opposite directions.

10 Claims, 7 Drawing Figures

APPARATUS FOR PLASTICIZING MATERIAL SUCH AS RUBBER, SYNTHETIC PLASTICS AND LIKE PLASTICIZABLE COMPOSITIONS

The invention relates to an apparatus for plasticising material such as rubber, synthetic plastics and like plasticisable compositions, wherein material to be plasticised is fed under pressure through a gap between two surfaces, of which at least one is moving.

In the technology of working with rubber, synthetic plastics and like plastics compositions, it has been previously proposed for plasticising such materials, i.e. kneading, thorough mixing and homogenising of the same, to pass the starting material through a gap between at least two surfaces, whereby at least one of the two surfaces is profiled, the profiling system consisting of adjacently disposed encircling grooves and webs defining such grooves, and in which at least one of the two surfaces is rotatingly moved and takes the form of a roller.

Thus, for example, a rolling mechanism has been proposed which is constructed from two rollers, both rollers having adjacently disposed and interengaging grooves lying on peripheral lines and formed by alternating raised parts and depressions. The composition to be worked is guided through the gap between the rollers as a web corresponding to the width of the rollers, a surface being imparted to it thereby in accordance with the profiling of the rollers.

A disadvantage inherent in this rolling mechanism resides in that, by virtue of the form of the profiling and the movement of the web parallel with the roller axes and over the entire width thereof, the shearing forces created by the kneading and imposed upon the material parts are very regular with respect to period and direction of action so that an intensive and thorough working, thorough mixing and homogenising cannot be achieved.

It has furthermore been proposed to feed material which is to be treated into a gap between a roller having a smooth surface and another roller the surface of which has a helically extending groove. In this case, the material is fed in at one end of the rollers, conveyed through the spiral groove and withdrawn at the other end of the roller arrangement. This method can also be modified in that the helical groove, starting from both roller ends, is guided in opposite directions and inwardly towards the centre of the rollers in order that the material may be withdrawn at the middle position.

In this case, the material is from the outset so to speak divided into strips corresponding to the width of a groove and undergoes relatively minimal kneading and thorough mixing on its way from the feed side to the withdrawal side.

In another previously proposed method, the material to be plasticised is initially passed between a profiled roller and adjacently disposed smooth walls of a housing enclosing the roller, after which it is fed into the gap which is between this roller and a further profiled roller. In this case, the profilings of both rollers may engage so closely into one another that the raised portions of the second roller press into the depressions in the first-mentioned roller, so leaving for the material passed through the grooves only the spaces between the raised parts of the first-mentioned and the depressions of the further roller. In consequence, the material is guided on a helically wound track from the feed end laterally to a nozzle head from which it can be withdrawn as a strand of material.

Also in this case, therefore, the material to be plasticised has little opportunity of being properly and thoroughly mixed or for internal shearing work to bring about any working or homogenisation.

According to the invention there is provided an apparatus for plasticising material such as rubber, synthetic plastics and like plasticisable compositions. The material to be plasticised is passed under pressure through a gap between two surfaces, at least one surface of which is rotatingly propelled, subjecting the material thereby repeatedly, and in a direction at right-angles to the direction of movement of said one surface, to a continuously or stepwise diminishing and reincreasing pressure, thereby successively subjecting it to very intensive and then less intensive shearing work, and subsequently completely relieving it of pressure.

Preferably both surfaces are moved and at different speeds.

Apparatus of the invention preferably comprises members defining two spaced apart surfaces at least one of which is rotating, at least said one of the surfaces having therein helically extending grooves defined by intermediate webs, the surfaces co-operating with one another such that in operation they present to the material a repeatedly continuously or stepwise widening and narrowing gap, a finite gap remaining at all times between the highest raised portions of said one surface and the co-operating surface.

In the apparatus of the invention, rubber, synthetic plastics and similar plasticisable compositions can be intensively but gently and briefly plasticised not only by kneading by the pressure created by passage through narrow gaps, but by furthermore subjecting the material to an inner shearing work which while being intensive does not constitute a loading on the material, and by which it is additionally possible, subsequent upon the shearing, thoroughly to blend the material by repeated superposed layering.

Thus the processed material can be continuously and repetitively passed through gap portions which are evenly or stepwise widened and then in the same way narrowed again. Thus, the material which by reason of the helical pattern of the profiling is also subjected to an axial thrust component, also in the extremely narrow parts of the gap undergoes an intensive shearing so that in the subsequent few narrow parts there is a relieving of pressure and therefore a medium-intensity shearing while there is a complete relieving of pressure in the widest part. In the gap portions of medium and also in those of maximum width, the axially moved material will assume a superposed layered relationship and will thus become thoroughly mixed. In an axial direction, then, in the successive and again narrowing portions of the gap, a shearing work increasing in size follows, reaching its new maximum in the following narrowest part of the gap. Thus, the necessary violent shearing occurs only for just a brief time, and therefore does not damage the material which can recover during the subsequent relieving of pressure and can find space to become thoroughly mixed. By virtue of the resultant satisfactory kneading and thorough mixing, it is also possible, in a manner which safeguards sensitive material, to reduce the total dwell time of the material, and the surfaces forming the gap can be made shorter.

The constantly changing gap of variation which provides for kneading, thorough mixing and homogenising of the material to be plasticised can only be incompletely described. If, for example, two surfaces having spirally extending grooves and intermediate webs rotate at speeds which differ from one another, then of course the reciprocal layers of grooves forming narrower or wider gaps, and the webs which define them will constantly vary. If, for example, in the case of two contrarotating rollers producing the gap, the gap between two webs is described as "narrow", that between a web and a groove as "medium" and that between two grooves as "wide", then as will be explained hereinafter with reference to the accompanying drawings, in four successive points in time, in an axial direction of feeding, gap combinations "narrow-medium-wide", then "narrow-medium-medium", then "narrow-medium-narrow" and finally "narrow-wide-narrow" will result. By reason of these constantly changing gap combinations, a particularly satisfactory and thorough kneading and mixing will be achieved. This can be achieved by simple means for by reason of the fact that the profiling need not bear on the counter-surface or in the case of two profiled surfaces being used, the profilings on the two surfaces which are moved at different speeds, as for example in the case of rollers (the speed of one surface being equal to zero or even being negative), need not engage into one another and therefore need not be accurately fitted into one another, also a less than accurate working of the surfaces is needed and no metallic abraded material will be produced, even in the case of new rollers which have not yet run in.

In addition to the previously explained diversely-formed and alternately presented gap combinations, then in the case of the two relatively moving faces each having a profiled surface, there is the fact that the material emerging from one "narrow" gap passes alternately into a low and then into a higher "medium" gap.

Furthermore, the invention permits of particularly good heat conduction, because the heat generated in the "narrow" gaps by virtue of the intensive shearing work is, in the "medium" and particularly in the "wide" gaps, given off to the material disposed therein and is utilised for plasticising the product.

The invention is diagrammatically illustrated by way of example in the accompanying drawings, in which.

Figure 1:
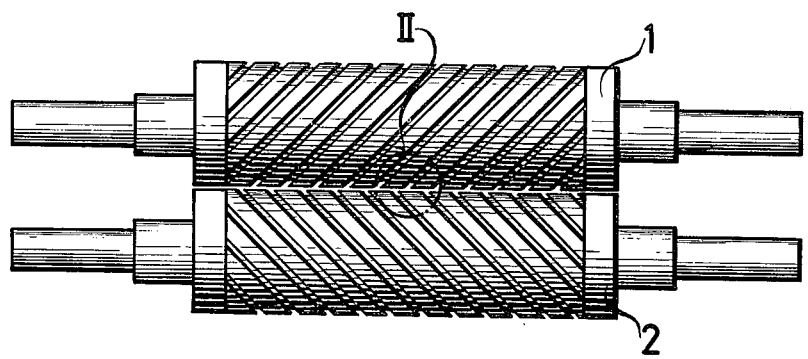
FIG. 1 is a plan view of one embodiment of apparatus suitable for carrying out the method according to the invention, in the form of a roller mechanism.
Figure 2:
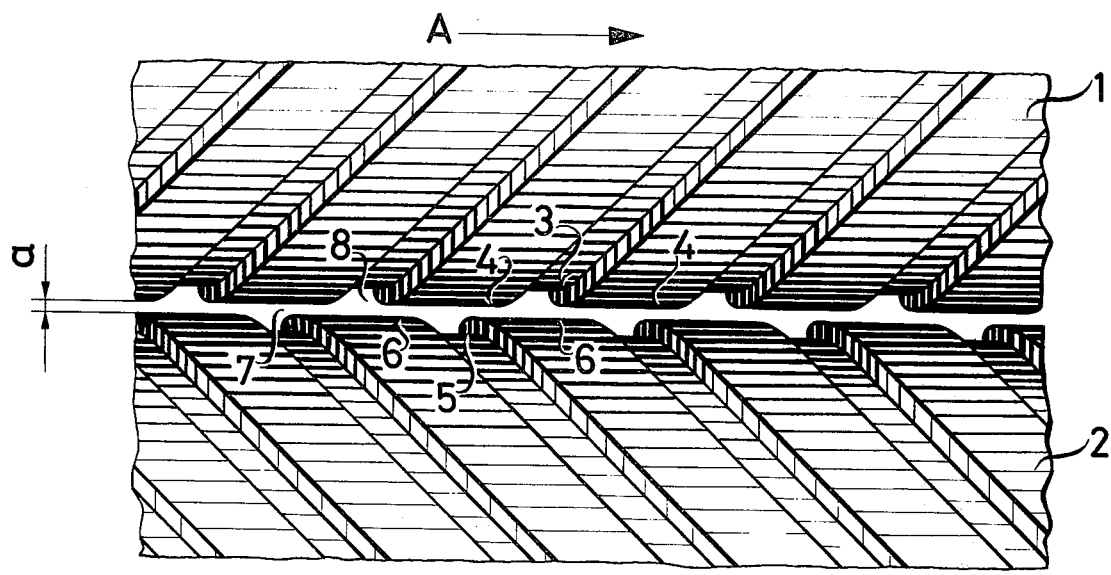
FIG. 2 shows to a substantially enlarged scale, and in perspective view, the portion II indicated in FIG. 1.

FIG. 1 shows a greatly simplified and entirely diagrammatic view of one embodiment of the invention which comprises a roller mechanism, of which a portion II, bounded by dash-dotted lines, is shown on an enlarged scale in FIG. 2. It will be seen that the surfaces of rollers 1 and 2 are profiled, in that one roller 1 has, extending along a helical line, grooves 3 which are defined by webs 4, while the other roller 2 has corresponding but oppositely extending grooves 5 and webs 6. In the case of the examples illustrated, the grooves 3, 5 are substantially narrower than the webs 4, 6 which define them, so that in the position of the rollers as illustrated, these project on both sides of the oppositely disposed groove in the other roller. In this case, the rollers are mounted at such a distance from each other as will leave a roller gap $a$, in other words the webs 4 and 6 are spaced apart from each other.

Figure 3:
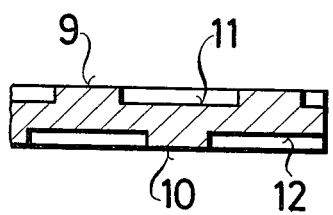
FIG. 3 shows a section through a skin of material produced by apparatus according to FIGS. 1 and 2 with both rollers rotating at the same speed.
Figure 4:
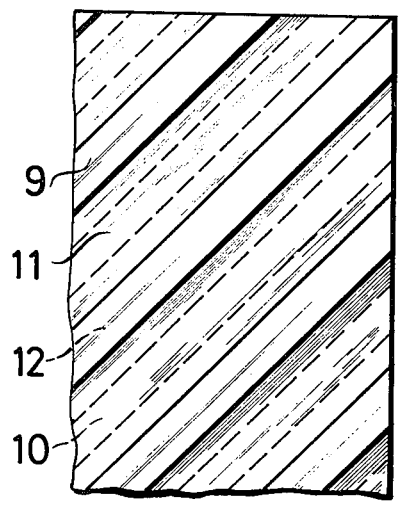
FIG. 4 is a laid flat view of a skin of material corresponding to FIG. 3.

When the rollers 1 and 2 according to FIG. 2 rotate at the same peripheral speed, material fed between them is repeatedly moved in the direction indicated by arrow A from a narrow gap 7 between a web 4 and a web 6 into a comparatively wider gap 8, between a web 6 and a groove 3 or a web 4 and a groove 5, over the length of the roller, whereby shearing and thorough kneading take place in the relatively narrow gap 7 while in the relatively wider gap 8 there is a relieving of pressure and a superimposed layering with resultant thorough mixing of material. This produces a roller skin according to FIGS. 3 and 4 with oblique ribs 9 and 10 extending parallel with one another and corresponding to the grooves 3 and 5 and which alternate with depressions 11 and 12 corresponding to the webs 4 and 6 of the rollers 1 and 2.

Figure 5:
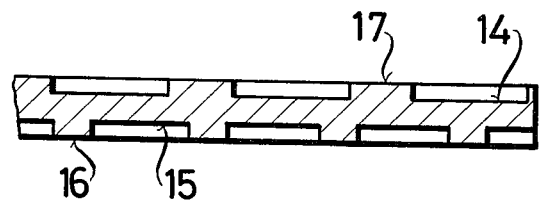
FIG. 5 shows a section through a skin of material produced by apparatus according to FIGS. 1 and 2 with the rollers having different surface speeds.
Figure 6:
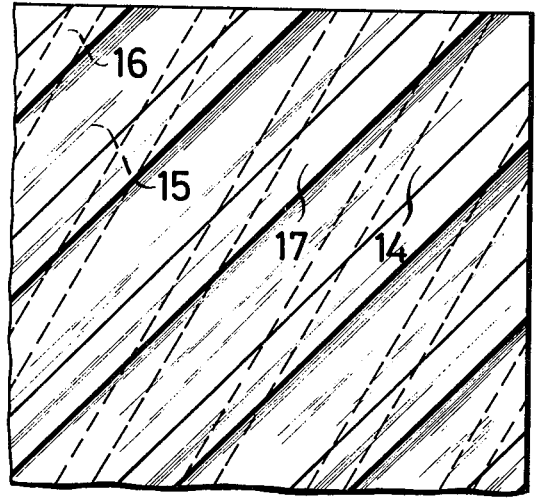
FIG. 6 is a laid flat view of a skin of material corresponding to FIG. 5.

If the rollers 1 and 2, which are heated or cooled as the case may be by the heat generated by the material and by the shearing and kneading work, run at different speeds, the roller 2 having for example a 25% superiority in speed, roller skins of the kind shown in FIGS. 5 and 6 result. By reason of the different peripheral speeds of the rollers 1 and 2, the helical groove 5 on the more rapidly moving roller 2 alternately crosses the helical groove 3, the roller web 4 and subsequently the next helical groove 3 and so on, on the more slowly moving counterroller 1. In the same way, the roller web 6 of the faster roller 2 alternately crosses the helical groove 3, the roller web 4 and the next helical groove 3 and so on, of the more slowly moving roller 1. If, thereby, the two webs 4 and 6, which are broad in the example illustrated, in the two rollers 1 and 2 run into each other, then momentarily, for example with a gap width $a$ of 1 mm, the usual shearing action of a rolling mill is created. When a web 4 (or 6) and a helical groove 5 (or 3) meet each other, then, defined in space and time, the gap width a is increased by the depth of the helical groove 3 or 5 and when two helical grooves 3 and 5 meet, locally two groove depths are added to the gap $a$ to become the width of the gap. FIG. 6 shows a section through a skin of material produced by this interaction of webs and grooves and having ribs 17 and 16 corresponding respectively to the grooves 3 and 5 and depressions 14 and 15 corresponding respectively to the webs 4 and 6.

In consequence, in constant interchange according to the difference in peripheral speed of the rollers, three extremely varying shearing, kneading and mixing actions occur in the different gaps, namely:
 1. violent shearing which, since it is only brief is harmless to the material, occurs between depressions 14 and 15 corresponding to the webs 4 and 6 of the rollers 1 and 2 to give the narrowest gap 7;

2. medium shearing loading when a depression 14 is opposite a rib 16 or a rib 17 is opposite a depression 15 to form a gap 8; and
3. briefly almost complete relieving of the shearing effect and the superimposed layering and thorough mixing of the supplied material when a rib 17 is opposite a rib 16.

The usual shearing resulting from radial pressure and radial movement is increased by an axially acting thrust component, and from the superimposition of these two forces, there is a resultant diagonal shearing force within the spatial lattice.

The more rapidly revolving helical groove 5, in a pulling movement, scrapes from the matching web 4 the material sheared off violently just a little beforehand. In the groove on the other hand, the material rotates and moves in both directions partly in and partly against the direction of movement of the groove out of the thrust range of the roller gap. At the moment of cross-over of the two helical grooves, these combine lattice-wise to form a large through-flow cross-section and briefly permit of large-area layering and thorough mixing of material. Immediately thereafter, the driving edge of the next broad web 6, like an encircling, drawing cutting edge, cuts the large volume into two parts and medium intensity shearing occurs between web 6 and a groove 3 and finally again there is the extremely intensive shearing of the two web faces 4 and 6.

Figure 7:
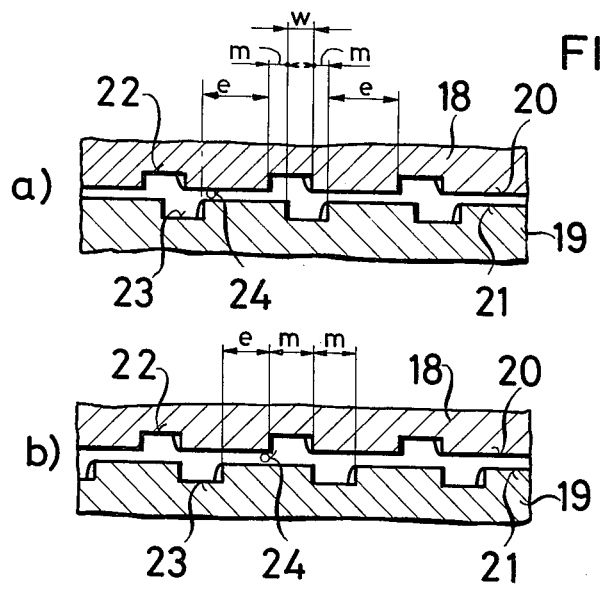
FIG. 7 shows in four different phases a to d and diagrammatically, the different gaps which are formed when two profiled surfaces of apparatus according to the invention pass by one another at extremely diverging speeds.
Figure 7:
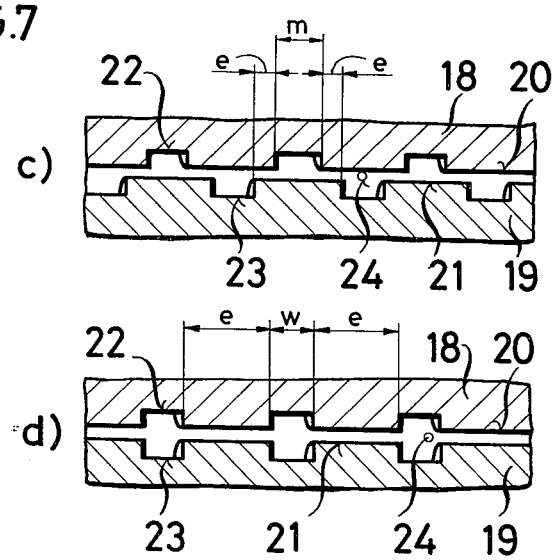

In FIGS. 7a to 7d, for particularly clear illustration of the shearing and mixing processes, two profile faces which are moved with respect to each other, are shown, the surface 18 moving at "zero" speed, in other words being stationary, while the surface 19 is a surface which is moved rotatingly past the surface 18. Accordingly, FIG. 7 for example may be regarded as a diagrammatic view of a roller 19 in a closely fitting and partially enclosing housing or trough 18 having profiled walls. The "narrow" gap zone between two webs 20 and 21 is identified by $e$, the "medium width" gap zone between a web 20 or 21 and a groove 22 or 23 is $m$ and the "wide" part of the gap between two helical grooves 22 and 23 is $w$. It will be evident that when the roller 19 is rotating and the matching surface 18 is stationary (or is rotating very slowly), the length and width of the gap zones will be subject to constant variation. For example in FIG. 7a, the gaps "narrow-medium-wide" and according to FIG. 7b the gaps "narrow-medium-medium" follow each other. In FIG. 7c the gaps "narrow-medium-narrow" follow one another and again, somewhat later, as shown in FIG. 7d, the gaps "narrow-wide-narrow" follow one another. Thus, a portion of material 24 moved from left to right in the drawing will be subjected to constantly changing forces both with regard to the direction of application and also with regard to the intensity and duration of the pressure.

The form of embodiment illustrated, which has sharply-edged webs and helical grooves has been found advantageous by reason of the drawing-cutting action mentioned, which it creates, but the action of violent shearing explained takes place in a narrow gap, the subsequently diminished shearing and partial relieving of load and the subsequent complete relieving of load and thorough mixture occur even if all that is maintained is the principle whereby spirally or helically-extending depressions alternate with webs located between them, both of which may be rounded-off, and if furthermore a distance $a$ is left between the webs which define the depressions.

The ratio of the length of the helical grooves to the length of the webs, in conjunction with the proportion of the peripheral speeds of the mutually moved surfaces, gives the relevant duration of gap action. Therefore, the longer are for example the webs between the helical grooves, the longer is the relevant action in a narrow and medium-wide gap and vice versa.

For the helical grooves width, values of 2 to 25 mm and preferably 7 to 10 mm have been found successful, while for the widths of the remaining helical web faces, widths of 2 to 50 mm and preferably 10 to 25 mm have been successful, whereas the depth of the helical grooves should be 1 to 20 mm and preferably 2 to 4 mm. The pitch of the webs and grooves on one moving surface, e.g. a roller, should be 15° to 75° and preferably 45°, or in the case of a counter-rotating pitch on the other surface, it should correspondingly be 105° to 165° and preferably 135°.

The invention is suitable for the processing of powdered material as well as for coarse granulates or preheated balls of material. Equally well, cold material may be intensively blended in situ with already pre-plasticised material. The shearing heat locally produced in the narrow gap is used immediately afterwards in the wider gap for heating the cold new material and can thus be harmlessly and usefully dissipated. The efficiency thus becomes unexpectedly high, the plasticising rate almost twice as great and the driving output consumed, the roller loading and the bearing loading are nevertheless considerably lower (30 to 40%) than in the case of known equipment. The mixing action, the degasification and the homogenising action are doubled without the material being over loaded.

For a successfully tried and proven performance, the following dimensions were chosen:

| | |
|---|---|
| Depth of helical groove | 2.5 mm |
| Width of helical groove | 7.0 mm |
| Distance from helical groove to helical groove | 12.0 mm |
| Helical pitch | 45° |
| Roller diameter | 185 mm diam. |
| Length of the multiple helical profiling | 270 mm |

The particular embodiment of multiple helix profile which is suitable depends upon the property of the plastics material to be processed and upon the size of the apparatus. Multiple helix profiling is preferably even over the entire length of the roller, but already prior to the region of the scraper jaws, it merges in per se known manner into a smooth roller surface. Equally well, in known manner, if it is intended to prevent the material wandering in one direction, then it is possible to provide on each roller shell helical grooves which run in opposite directions in the longitudinal axis.

Preferably rollers rotating in opposite directions and at different speeds are provided with so-called multiple-helix groove profiles of opposite pitch, the working roller being for example a roller with a right-hand thread while the counterroller has a left-hand thread. By reason of the difference in speeds, one wall of gaps filled with the plasticising material will always "hang back" with respect to the other so that there will be a kind of braking action on the side of the more slowly revolving roller. This, too, will promote shearing and thorough mixing.

However, it also lies within the scope of the invention to provide two rollers with a multiple-helix groove profile of equi-directional pitch and to run the two rollers in the same direction but at different surface speeds.

Furthermore, the two rollers may have multiple-helix grooves of unequal pitch per roller and may have unequal depths of widths of helical grooves.

If, by means of a housing, counter-surfaces are provided for the rollers with the multiple-helical grooves, after the nature of double-screw extruders, then rotation will create pump pressure in an axial direction.

What is claimed is:

1. Apparatus for plasticising rubber and plastics materials, comprising a pair of members defining two spaced apart surfaces, means for rotating at least one of said members, each of said surfaces being formed to present helically extending grooves defined by helically extending intermediate webs, with the webs of each of said surfaces being axially offset relative to each other and being of a width relative to the width of the grooves on the opposite surface so that each web projects on both sides of an opposed groove, said surfaces cooperating with one another such that the material is subjected to constantly changing gap combinations defined respectively by a narrow gap between web surfaces, a medium gap between a web surface and the bottom of an opposed groove, and a wide gap between opposed grooves, thereby achieving thorough kneading and mixing of the material.

2. Apparatus as claimed in claim 1, wherein the surface of said rotating member is the surface of a roller.

3. Apparatus as claimed in claim 1, wherein said grooves and said webs have a rectangular cross-section.

4. Apparatus as claimed in claim 3, wherein said grooves have a width lying within the range 2 to 25 mm and a depth lying within the range 1 to 20 mm, said webs have a width lying within the range 2 to 50 mm and said helical pitch amounts lie within the range 15° to 75°.

5. Apparatus as claimed in claim 1, wherein said grooves have a width of about 7 mm and a depth of about 2.5 mm, said webs have a width of about 12 mm and said helical pitch is about 45°.

6. Apparatus as claimed in claim 1, further including means for driving said members in opposite directions, and wherein said members comprise rollers having grooves of oppositely orientated pitch therein.

7. Apparatus as claimed in claim 1, further including drive means for rotating said members in the same direction, and wherein the grooves have the same pitch.

8. Apparatus as claimed in claim 7, wherein said drive means rotates said members at different rotational speeds.

9. Apparatus as claimed in claim 1, wherein said grooves on said members are of different pitch.

10. Apparatus as claimed in claim 1, wherein the width of said grooves on one of said members is less than that on the other of said members.

* * * * *